United States Patent
Utsugi (10) Patent No.: US 8,149,301 B2
(45) Date of Patent: Apr. 3, 2012

(54) IMAGE PROCESSING DEVICE, CORRECTION INFORMATION GENERATION METHOD, AND IMAGE-CAPTURING DEVICE

(75) Inventor: Akihiko Utsugi, Tokyo (JP)

(73) Assignee: Nikon Corporation, Tokyo (JP)

( * ) Notice: Subject to any disclaimer, the term of this patent is extended or adjusted under 35 U.S.C. 154(b) by 555 days.

(21) Appl. No.: 12/318,333

(22) Filed: Dec. 24, 2008

(65) Prior Publication Data

US 2009/0167907 A1 Jul. 2, 2009

(30) Foreign Application Priority Data

Dec. 28, 2007 (JP) ................................ 2007-339352

(51) Int. Cl.
*H04N 5/217* (2011.01)
(52) U.S. Cl. ........................................ 348/241; 348/246
(58) Field of Classification Search .................. 348/241, 348/246, 247; 250/377, 378; 382/162–167
See application file for complete search history.

(56) References Cited

U.S. PATENT DOCUMENTS

| 7,656,443 | B2 * | 2/2010 | Ikeda ............................ 348/246 |
| 2004/0239782 | A1 | 12/2004 | Equitz et al. | |
| 2005/0047658 | A1 | 3/2005 | Kita | |
| 2005/0280721 | A1 | 12/2005 | Van Der Heide et al. | |
| 2007/0165119 | A1 | 7/2007 | Ikeda | |
| 2007/0222871 | A1 | 9/2007 | Goma et al. | |

FOREIGN PATENT DOCUMENTS

| EP | 1 487 193 A1 | 12/2004 |
| JP | A-2005-175547 | 6/2005 |
| WO | WO 2007/036055 A1 | 4/2007 |

OTHER PUBLICATIONS

Jul. 5, 2011 Office Action issued in corresponding Japanese Patent Application No. 2004-362441.
Aug. 3, 2011 Office Action issued in corresponding European Application No. 08 172 896.6.

* cited by examiner

*Primary Examiner* — Huy K Mai
(74) *Attorney, Agent, or Firm* — Oliff & Berridge, PLC (57) ABSTRACT

An image processing device that corrects and interpolates pixel values of defective pixels present upon an image sensor, includes: a position information storage memory that stores a position of a defective pixel of a first type whose pixel value can be utilized after correction, and a position of a defective pixel of a second type whose pixel value is to be interpolated using pixel values of other pixels, distinguished from one another; a correction amount storage memory that stores a correction amount for the defective pixel of the first type; a correction unit that corrects the pixel value of the defective pixel of the first type according to the correction amount; and an interpolation unit that interpolates the pixel value of the defective pixel of the second type, using the pixel values of pixels including the defective pixel of the first type whose pixel value has been corrected by the correction unit.

8 Claims, 5 Drawing Sheets

| 0 | 1 | 1 | 1 | 0 |
|---|---|---|---|---|
| 1 | 1 | 1 | 2 | 1 |
| 1 | 1 | 2 | 2 | 1 |
| 1 | 1 | 1 | 1 | 1 |
| 0 | 1 | 1 | 1 | 0 |

FIG.4

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 1 | 1 | 1 | 0 | 0 | 0 |
| 0 | 1 | 1 | 1 | 2 | 1 | 0 | 0 |
| 0 | 1 | 1 | 2 | 2 | 1 | 0 | 0 |
| 0 | 1 | 1 | 1 | 1 | 1 | 0 | 0 |
| 0 | 0 | 1 | 1 | 1 | 0 | 0 | 0 |
| 0 | 0 | 0 | 0 | 0 | 0 | 0 | 0 |

FIG.5

| 0 | 0 | 0   | 0   | 0   | 0   | 0 | 0 |
|---|---|-----|-----|-----|-----|---|---|
| 0 | 0 | 0   | 0   | 0   | 0   | 0 | 0 |
| 0 | 0 | 1.5 | 1.4 | 1.4 | 0   | 0 | 0 |
| 0 | 1.3 | 1.7 | 1.8 | 0 | 1.3 | 0 | 0 |
| 0 | 1.4 | 1.8 | 0   | 0 | 1.2 | 0 | 0 |
| 0 | 1.4 | 1.5 | 1.4 | 1.2 | 1.5 | 0 | 0 |
| 0 | 0 | 1.3 | 1.2 | 1.1 | 0   | 0 | 0 |
| 0 | 0 | 0   | 0   | 0   | 0   | 0 | 0 |

IMAGE PROCESSING DEVICE, CORRECTION INFORMATION GENERATION METHOD, AND IMAGE-CAPTURING DEVICE

INCORPORATION BY REFERENCE

The disclosure of the following priority application is herein incorporated by reference: Japanese Patent Application No. 2007-339352 filed Dec. 28, 2007

BACKGROUND OF THE INVENTION

1. Field of the Invention

The present invention relates to an image processing device, a correction information generation method, and an image-capturing device.

2. Description of Related Art

A damage correction circuit of the following type is per se known. This damage correction circuit generates interpolated pixel values for defective pixel positions by utilizing pixel values in the neighborhood of the defective pixels (refer to Japanese Laid-Open Patent Publication 2005-175547).

SUMMARY OF THE INVENTION

However, if a large item of debris adheres to the image sensor during the production process, then defective pixels may sometimes be created in the form of a clump over a large range such as, for example, five pixels wide, and, when interpolating over such a large clump of defective pixels, the accuracy of interpolation of the values near the center of the defective pixel clump is remarkably decreased, since the interpolation is performed using the values of normal pixels that are positioned relatively far outside the clump of defective pixels.

According to the 1st aspect of the present invention, an image processing device that corrects and interpolates pixel values of defective pixels present upon an image sensor, comprises: a position information storage memory that stores a position of a defective pixel of a first type whose pixel value can be utilized after correction, and a position of a defective pixel of a second type whose pixel value is to be interpolated using pixel values of other pixels, distinguished from one another; a correction amount storage memory that stores a correction amount for the defective pixel of the first type; a correction unit that corrects the pixel value of the defective pixel of the first type according to the correction amount; and an interpolation unit that interpolates the pixel value of the defective pixel of the second type, using the pixel values of pixels including the defective pixel of the first type whose pixel value has been corrected by the correction unit.

According to the 2nd aspect of the present invention, in the image processing device according to the 1st aspect, it is preferred that: a correction amount for the defective pixel of the first type is a ratio between an output of a normal pixel and an output of the defective pixel of the first type; and the correction unit performs correction of the pixel value of the defective pixel of the first type, by multiplying the pixel value of the defective pixel of the first type by the correction amount.

According to the 3rd aspect of the present invention, in the image processing device according to the 1st aspect, it is preferred that the image processing device further comprises a smoothing unit that takes the defective pixel of the first type after correction by the correction unit, as a smoothing subject pixel to be smoothed, and that smoothes the pixel value of the smoothing subject pixel using the pixel value of the smoothing subject pixel and pixel values of pixels neighboring the smoothing subject pixel.

According to the 4th aspect of the present invention, in the image processing device according to the 3rd aspect, it is preferred that the smoothing unit performs smoothing using pixel values of pixels, among the pixels neighboring the smoothing subject pixel, other than the defective pixel of the first type and the defective pixel of the second type.

According to the 5th aspect of the present invention, in the image processing device according to the 3rd aspect, it is preferred that the smoothing unit performs smoothing using pixel values of pixels, among the pixels neighboring the smoothing subject pixels, other than the defective pixel of the second type.

According to the 6th aspect of the present invention, in the image processing device according to any one of the 3rd through 5th aspects, it is preferred that the smoothing unit performs smoothing using pixel values of pixels, among the pixels neighboring the smoothing subject pixels, that have color filters of the same colors as a color filter of the smoothing subject pixel.

According to the 7th aspect of the present invention, in the image processing device according to any one of the 3rd through 6th aspects, it is preferred that the smoothing unit performs smoothing using pixel values of pixels, among the pixels neighboring the smoothing subject pixels, for which differences from the pixel value of the smoothing subject pixel are within a predetermined value.

According to the 8th aspect of the present invention, a correction information generation method for generating a position of a defective pixel of a first type, a position of a defective pixel of a second type, and a correction amount for the defective pixel of the first type of an image processing device according to any one of the 1st through 7th aspects, comprises: calculating correction amounts for image data, based upon a plurality of sets of image data that have been photographed while changing at least one of photographic conditions that are exposure amount, color of incident light, temperature of an image sensor, F-value of a lens, and pupil position of the lens; when defective pixels of the plurality of sets of image data have been corrected based upon the correction amounts, classifying a defective pixel for which a degree, by which a pixel value after correction does not depart from an output value of a normal pixel, does not exceed by more than a predetermined value, as being the defective pixel of the first type; generating a position of this pixel and a correction amount of this pixel, as being the position of the defective pixel of the first type and the correction amount for the defective pixel of the first type; classifying a defective pixel other than the defective pixel of the first type as being the defective pixel of the second type; and generating a position of this pixel as being the position of the defective pixel of the second type.

According to the 9th aspect of the present invention, an image-capturing device comprises: an image sensor that captures an image of a photographic subject; and an image processing device according to any one of the 1st through 7th aspects that generates image data by performing image processing upon an image signal outputted from the image sensor, and the image processing device generates the image data by correcting and interpolating a pixel value of a defective pixel included in the image sensor, by using an image signal outputted from the image sensor.

DESCRIPTION OF THE PREFERRED EMBODIMENTS

Figure 1:
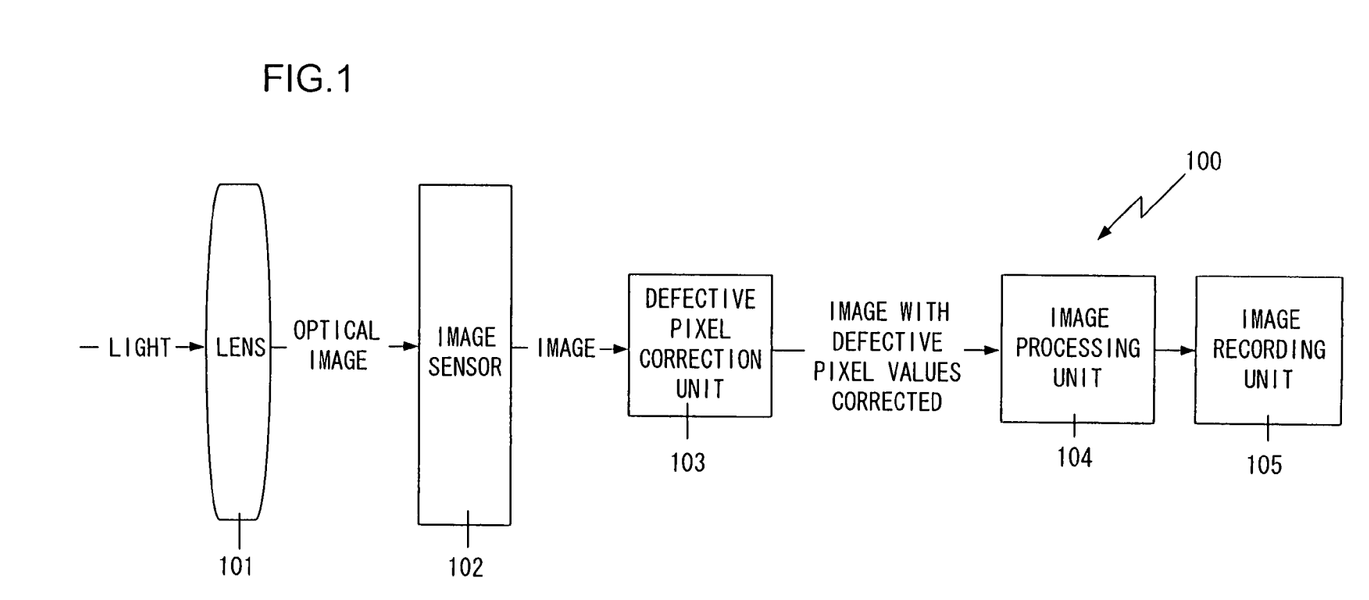
FIG. 1 is a block diagram showing the structure of a digital camera according to one embodiment of the present invention.

FIG. 1 is a block diagram showing the structure of a digital camera according to one embodiment of the present invention. This digital camera 100 comprises a lens 101, an image sensor 102, a defective pixel correction unit 103, an image processing unit 104, and an image recording unit 105.

The lens 101 includes a plurality of optical lenses, and forms an image of a photographic subject upon an image sensor 102. This image sensor 102 may be, for example, a CCD or a CMOS sensor, and an optical image is obtained as image data by the image sensor 102 being exposed for a certain time period. The image sensor 102 then outputs the image data that it has acquired to the defective pixel correction unit 103. At this time, if the image sensor 102 has a clump of defective pixels, then defective pixels will be present in the image data acquired by the image sensor 102. The defective pixel correction unit 103 performs processing that will be described hereinafter, thereby correcting the defective pixels in the image data captured by this image sensor that has a clump of defective pixels, and then outputs the image data after amendment to the image processing unit 104.

It should be understood that, in this embodiment, the defective pixels within the image are classified into two types, a first type of defective pixel and a second type of defective pixel, and the defective pixel correction unit 103 corrects each of these defective pixels, of both these types. Here, the first type of defective pixel is a pixel that provides a pixel output proportioned to the exposure amount, for which the ratio of the pixel output to the exposure amount has almost no dependence upon the temperature of the image sensor and the color of the incident light, and moreover for which the dependence of that ratio upon the F-value of the lens and upon the pupil position is within a predetermined value (for example 10%). And the second type of defective pixel is another defective pixel that does not satisfy the above condition for being a defective pixel of the first type described above. The defective pixels in the image sensor 102 are detected and identified in a factory where the digital camera 100 is manufactured, as explained later.

Figure 2:
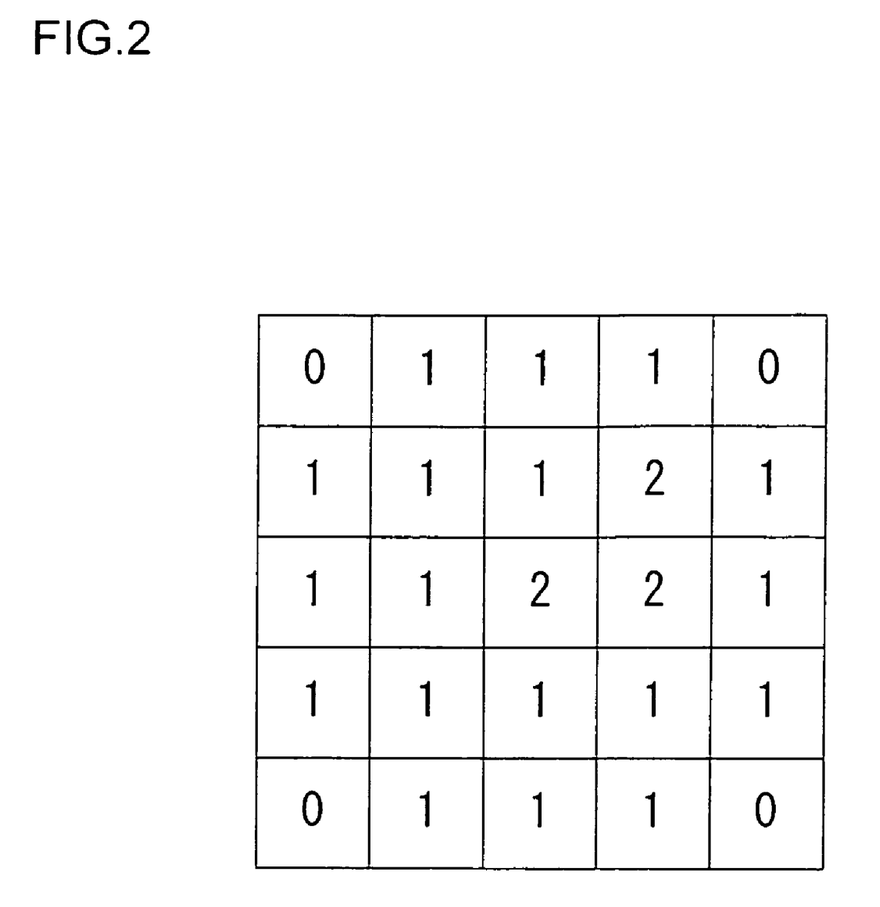
FIG. 2 is a figure showing a concrete example of the shape of a clump of defective pixels.

For example, when clumps of defective pixels in image data of width around five pixels or more have been investigated, it has been ascertained that, in most cases, this first type is present around the outer portion or shell portion of a clump of defective pixels. Such a clump of defective pixels may be shaped, for example, as shown in FIG. 2. The numerals in this FIG. 2 specify the types of the pixels, with "0" denoting a normal pixel, "1" denoting a defective pixel of the first type, and "2" denoting a defective pixel of the second type.

The image processing unit 104 performs per se known image processing such as white balance processing, color interpolation processing, edge enhancement processing, side enhancement processing and the like upon the image data that is inputted, and then outputs the image data that has thus been processed to the image recording unit 105. This image data is recorded by the image recording unit 105 upon an external storage medium such as, for example, a memory card or the like, or upon an internal storage medium such as a flash memory or the like. It should be understood that the defective pixel correction unit 103, the image processing unit 104, and the image recording unit 105 are achieved by a CPU and peripheral circuitry.

Figure 3:
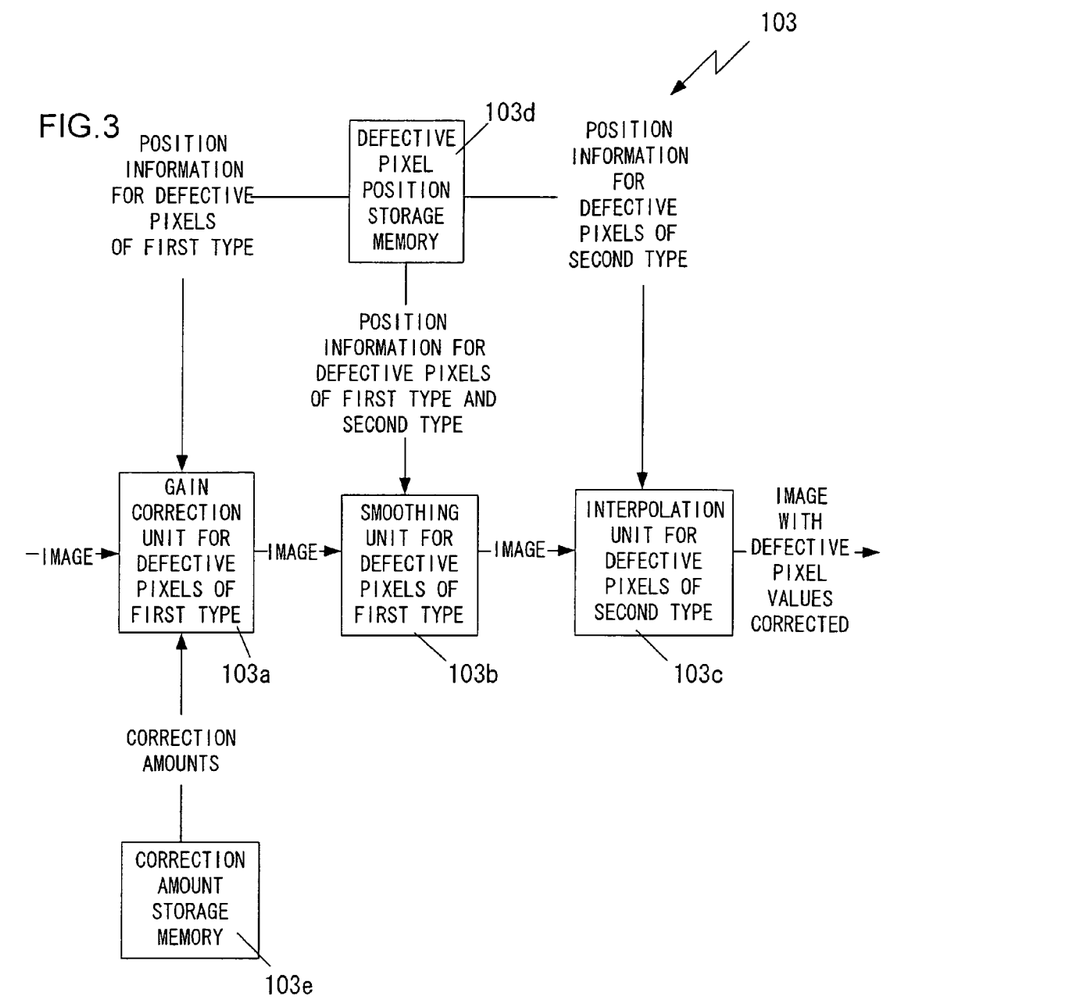
FIG. 3 is a block diagram showing the structure of a defective pixel correction unit 103.

FIG. 3 is a block diagram showing the structure of the defective pixel correction unit 103. In the following, the processing performed by this defective pixel correction unit 103 will be explained with reference to FIG. 3. The defective pixel correction unit 103 includes again correction unit 103a for defective pixels of the first type, a smoothing unit 103b for defective pixels of the first type, an interpolation unit 103c for defective pixels of the second type, a defective pixel position storage memory 103d, and a correction amount storage memory 103e. It should be understood that the defective pixel position storage memory 103d and the correction amount storage memory 103e may physically be different areas within the same memory, for example a flash memory, or may be physically different memories.

Figure 4:
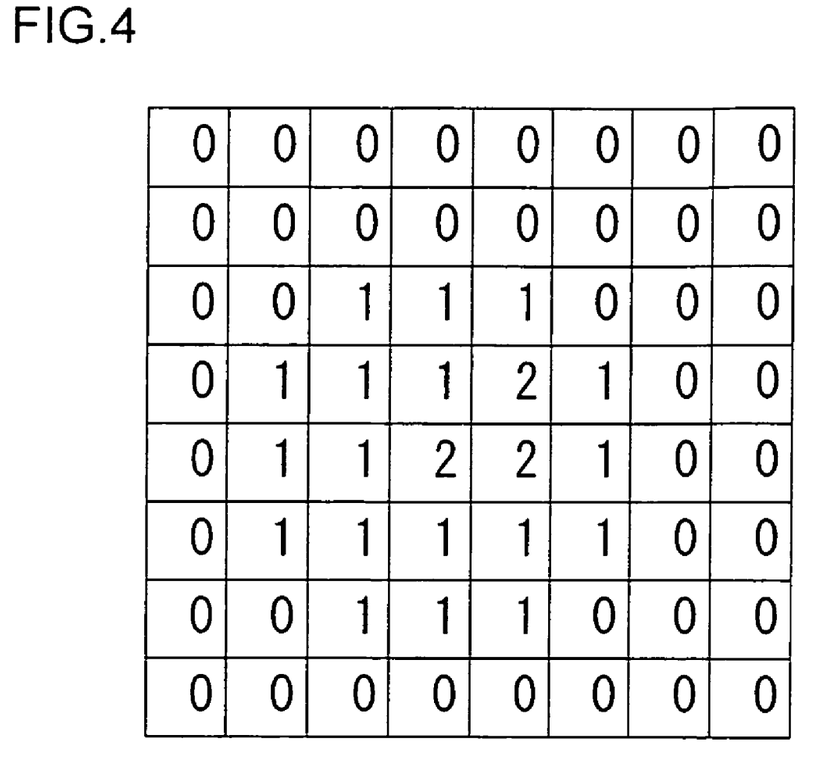
FIG. 4 is a figure showing a concrete example of a defect map D(i,j)

An 8×8 two dimensional array defect map D(i,j) (where i and j run from 0 to 7) is recorded in the defective pixel position storage memory 103d, as shown in FIG. 4. In this defect map D(i,j), normal pixels, defective pixels of the first type, and defective pixels of the second type are distinguished by the code values 0, 1, and 2 respectively. Moreover, if the pixel in the upper left position in the defect map D(i,j) in the defective pixel position storage memory 103d is taken as the origin, the coordinate values (x,y) of the image data in relation to that origin are recorded as the positions of the defective pixels. In other words, in the defect map D(i,j), a normal pixel at (x+i,y+j) is represented by D(i,j)=0, a defective pixel of the first type at (x+i,y+j) is represented by D(i,j)=1, and a defective pixel of the second type at (x+i,y+j) is represented by D(i,j)=2.

Figure 5:
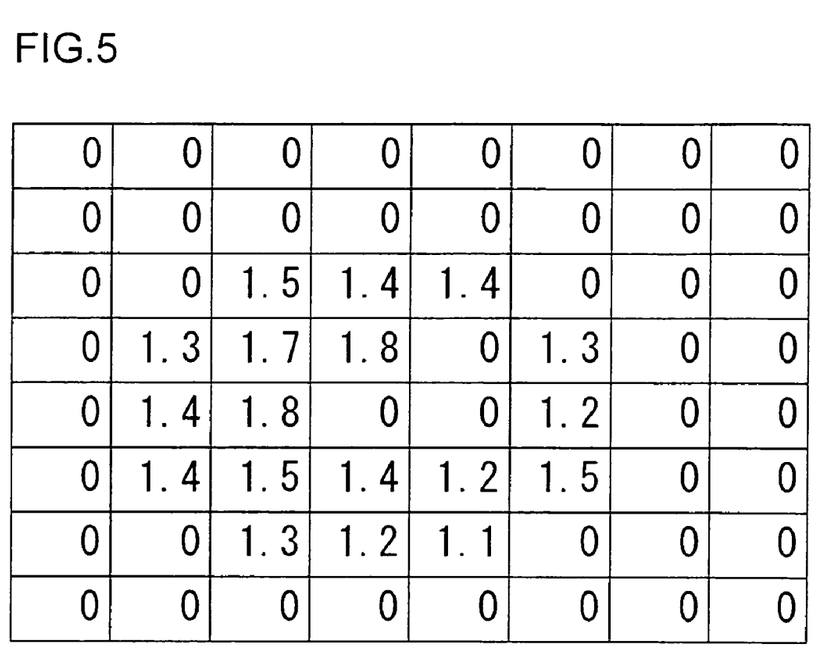
FIG. 5 is a figure showing a concrete example of a correction amount map C(i,j).

Correction amounts C(i,j) (where i and j run from 0 to 7) are stored in the correction amount storage memory 103e, for correcting the defective pixels of the first type at the coordinate values (x+i,y+j) in the image data. These correction amounts are the ratio of the output of a normal pixel to the output of the corresponding defective pixel of the first type. The correction amounts C(i,j) (i, j=0~7) may have, for example, values as shown in FIG. 5.

It should be understood that the positions in the image data of the defective pixels of the first type, the positions of the defective pixels of the second type, and the correction amounts C(i,j) for the defective pixels of the first type are obtained by testing the defective pixel characteristics of the image sensor 102 in the workplace during manufacture of the digital camera 100. In this testing, first, a plurality of sets of image data are acquired while varying the photographic conditions, such as the exposure amount, the color of the incident light, the temperature of the image sensor, the F-value of the lens, the pupil position of the lens, and so on. And the defective pixels whose outputs are anomalous are detected, and, for each of the defective pixels, the ratio of the output of a normal pixel to the output of that defective pixel is calculated on the basis of these sets of image data.

And correction is performed upon the defective pixel values of the above described plurality of sets of image data by multiplying them by the above ratios. And those defective pixels are classified as being defective pixels of the first type, for which the proportions by which the pixel output values after this correction has been performed differ from the output values for normal pixels are, for example, less than 10%. Moreover, those defective pixels that are not of the first type are classified as being of the second type. And a defect map D(i,j) that is generated on the basis of the results of this classification, and the positions of the defective pixels, are stored in the defective pixel position storage memory 103d. Moreover, correction amounts for the defective pixels of the first type are calculated, and are recorded in the correction amount storage memory 103e.

It should be understood that, if a plurality of clumps of defective pixels are present upon the image sensor 102, then a plurality of defect maps D(i,j) and sets of defective pixel positions, corresponding to each clump of defective pixels, are recorded in the defective pixel position storage memory 103d, and correction amounts for the defective pixels of the first type in each clump of defective pixels are stored in the correction amount storage memory 103e. By doing this, the digital camera 100 is shipped from the factory in a state in which the necessary information is recorded in the defective pixel position storage memory 103d and the correction amount storage memory 103e.

When a photographer performs photography using this digital camera 100, as described above, an optical image is obtained as image data by exposing the image sensor 102 for a certain time period, and the image data acquired by the image sensor 102 is outputted to the defective pixel correction unit 103. And the defective pixel correction unit 103 performs processing as described below upon this image data that has been inputted.

First, the image data that has been outputted from the image sensor 102 is inputted to the gain correction unit for defective pixels of the first type 103a. By referring to the defect map D(i,j) and the defective pixel positions (x,y) that are recorded in the defective pixel position storage memory 103d, the gain correction unit for defective pixels of the first type 103a specifies the pixels (x+i,y+j) in the image data that satisfy D(i,j)=1 in the defect map, as being defective pixels of the first type. And the gain correction unit for defective pixels of the first type 103a corrects the defective pixel values in the image data by multiplying the pixel values of these defective pixels of the first type (x+i,y+j) that have thus been specified by the correction amounts C(i,j) that are recorded in the correction amount storage memory 103e.

Next, the smoothing unit for defective pixels of the first type 103b performs smoothing processing upon the values for the defective pixels of the first type that have thus been corrected by the gain correction unit for defective pixels of the first type 103a. By doing this, it is possible to eliminate the gain correction errors due to the gain correction unit for defective pixels of the first type 103a. And, in this smoothing processing, the smoothing unit for defective pixels of the first type 103b smoothes the pixels that are the subjects of smoothing, in other words the defective pixels of the first type that have been corrected, by referring to pixels, among the pixels that have color filters of the same color as the smoothing subject pixels and lie within ranges of 9×9 pixels centered upon the smoothing subject pixels, that are not defective. In concrete terms, with the reference pixel values described above, the smoothing unit for defective pixels of the first type 103b calculates the average values of those pixel values for which

|the ratio of the pixel value of the reference subject pixel to the pixel value of the smoothing subject pixel−1| is within a predetermined value (for example within 12%), and smoothes the pixels that are to be the subjects of smoothing by substituting these average values for their pixel values.

Next, by referring to the defect map D(i,j) and the defective pixel positions (x,y) that are recorded in the defective pixel position storage memory 103d, the interpolation unit for defective pixels of the second type 103c specifies the pixels (x+i,y+j) in the image data that satisfy D(i,j)=2 in the defect map, as being defective pixels of the second type. And the interpolation unit for defective pixels of the second type 103c performs interpolation to create pixel values of the defective pixels of the second type (x+i,y+j) that have thus been specified.

The pixels that can be referred to during this interpolation processing are all of the pixels within the image, except the defective pixels of the second type. In other words, the interpolation unit for defective pixels of the second type 103c performs interpolation of the pixel values for the defective pixels of the second type (x+i,y+j), by taking all of the pixels within the image including the defective pixels of the first type that have already been corrected, as being pixels that can be referred to. It should be understood that any method for performing interpolation of the pixel values for the defective pixels of the second type (x+i,y+j) will be acceptable, provided that it substitutes, for the pixel values of the pixels that are to be the subjects of interpolation, the average values of the output values of the neighboring pixels that can be referred to and that have color filters that are the same colors as those of the subject pixels for interpolation, in other words of the defective pixels of the second type (x+i,y+j). Or it would also be acceptable to decide, by a per se known technique, the direction in which the similarity of the structure of the image is the highest, and to perform interpolation by utilizing the pixels that can be referred to existing in the direction of similarity with regard to the subject pixels upon which interpolation is to be performed.

After having executed the above described correction processing upon the defective pixels, the defective pixel correction unit 103 outputs the image data after amendment to the image processing unit 104. And, after having performed various types of image processing, as described above, upon the image data that has been inputted, the image processing unit 104 outputs the image data after image processing to the recording unit 105. Then, as described above, the image recording unit 105 records the input data that has thus been inputted upon the storage medium such as a memory card or the like.

According to this embodiment as explained above, the following beneficial operational effects may be obtained.

(1) The defective pixel correction unit 103 includes the defective pixel position storage memory 103d that stores the positions of the defective pixels of the first type the pixel values of which can be utilized by correcting the pixel values and the positions of the defective pixels of the second type whose pixel values must be interpolated using the pixel values of the other pixels while maintaining the distinction between them, and the correction amount storage memory 103e that stores correction amounts for the defective pixels of the first type, and the gain correction unit for defective pixels of the first type 103a corrects the pixel values of the defective pixels of the first type according to the correction amounts that are recorded in the correction amount storage memory 103e. And the interpolation unit for defective pixels of the second type 103c interpolates the pixel values of the defective pixels of the second type while utilizing the pixel values of pixels including defective pixels of the first type whose pixel values have been corrected by the gain correction unit for defective pixels of the first type 103a. Due to this, it is possible to perform interpolation of the pixel values of a clump of defective pixels present upon an image sensor at high accuracy.

(2) The correction amounts for the defective pixels of the first type are the ratios between the outputs of normal pixels and the outputs of these defective pixels of the first type, and it is arranged for the gain correction unit for defective pixels of the first type 103a to perform correction by multiplying the values of the defective pixels of the first type by these correction amounts. Due to this, it is possible to perform correction upon these defective pixels of the first type, whose defects are comparatively minor, by multiplying their pixel values by the correction amounts, simply and at high accuracy.

(3) It is arranged for the smoothing unit for defective pixels of the first type 103b to take the defective pixels of the first type, after correction has been performed upon them by the gain correction unit for defective pixels of the first type 103a, as the smoothing subject pixels, and to perform smoothing upon these smoothing subject pixels, using the pixel values of the smoothing subject pixels and the pixel values of pixels around them. Due to this, it is possible to eliminate errors in the gain correction performed by the gain correction unit for defective pixels of the first type 103a.

(4) It is arranged for the smoothing unit for defective pixels of the first type 103b to perform smoothing using the pixel values of the pixels, among the pixels around the smoothing subject pixels, with the exception of the defective pixels (i.e. of both the defective pixels of the first type and the defective pixels of the second type). Since, due to this, it is possible to perform smoothing without including the pixel values of the defective pixels, accordingly it is possible to eliminate the gain correction errors due to the gain correction unit for defective pixels of the first type 103a at high accuracy.

(5) It is arranged for the smoothing unit for defective pixels of the first type 103b to perform smoothing using the pixel values of those pixels, among the pixels surrounding the smoothing subject pixels, that have color filters of the same color as those of the smoothing subject pixels. Due to this, it is possible to prevent any influence being exerted upon the pixel values of pixels after smoothing having a color filter of one color, by the pixel values of pixels that have color filters of other colors.

(6) It is arranged for the smoothing unit for defective pixels of the first type 103b to perform smoothing using the pixel values of those pixels, among the pixels surrounding the smoothing subject pixels, for which the difference with the pixel values of the smoothing subject pixels is within a predetermined value. Due to this, it is possible to prevent the image after smoothing from losing its image structure.

(7) It is arranged, before shipment of the digital camera 100: to calculate the correction amounts for the image data on the basis of a plurality of sets of image data that have been photographed while varying at least one of the photographic conditions that are the exposure amount, the color of the incident light, the temperature of the image sensor, the F-value of the lens, and the pupil position of the lens; to classify those of the defective pixels for which the degree by which the pixel value after amendment, when the defective pixels of the plurality of sets of image data have been corrected on the basis of these correction amounts, deviates from the output value of a normal pixel does not exceed some predetermined value, as being the defective pixels of the first type; and to generate these pixel positions and these correction amounts as being the positions of the defective pixels of the first type and the correction amounts for the defective pixels of the first type, respectively. Furthermore, it is arranged to classify the defective pixels that are not of the first type as being defective pixels of the second type, and to generate the positions of these pixels as being the positions of those defective pixels of the second type. Due to this, it is possible for the user to acquire an image after amendment in which the above described correction of the defective pixels is performed, directly after he has purchased this digital camera 100.

Variant Embodiments

It should be understood that the digital camera of the embodiment described above may be varied in the following manners.

(1) In the embodiment described above, an example has been explained in which the defect map D(i,j) is an 8×8 two dimensional array. However, the size of the defect map D(i,j) is not to be considered as being limited to this particular case. For example, it would also be acceptable to arrange to record in the defective pixel position storage memory 103d, at the factory during production of the camera 100, a defect map D(i,j) of a size that corresponds to the size of a clump of defective pixels upon the image sensor 102.

(2) In the embodiment described above, an example has been explained in which the smoothing unit for defective pixels of the first type 103b smoothes the pixel values of the defective pixels of the first type that have been corrected (that are the pixels that are to be the subjects of smoothing), using pixels, among the pixels that have color filters of the same color as those of those smoothing subject pixels and are within ranges of 9×9 pixels centered upon those smoothing subject pixels, that are not defective (i.e. that are neither defective pixels of the first type nor defective pixels of the second type). However, it would also be acceptable to arrange for the smoothing unit for defective pixels of the first type 103b to perform smoothing upon the pixel values of the defective pixels of the first type that have been corrected (that are the pixels that are to be the subjects of smoothing), using pixels, among the pixels that have color filters of the same color as those of those smoothing subject pixels and are within ranges of 9×9 pixels centered upon those smoothing subject pixels, that are not defective pixels of the second type.

(3) In the embodiment described above, an example of correction processing for defective pixels has been explained in which this processing is performed by a digital camera 100. However, it would also be acceptable to arrange for this processing to be performed by some other type of image processing device that possesses an image sensor, such as, for example, a portable telephone with attached camera, or a video camera or the like.

The above described embodiments are examples, and various modifications can be made without departing from the scope of the invention.

What is claimed is:

1. An image processing device that corrects and interpolates pixel values of defective pixels present upon an image sensor, comprising:

a position information storage memory that stores a position of a defective pixel of a first type whose pixel value can be utilized after correction, and a position of a defective pixel of a second type whose pixel value is to be interpolated using pixel values of other pixels, distinguished from one another;

a correction amount storage memory that stores a correction amount for the defective pixel of the first type;

a correction unit that corrects the pixel value of the defective pixel of the first type according to the correction amount; and an interpolation unit that interpolates the pixel value of the defective pixel of the second type, using the pixel values of pixels including the defective pixel of the first type whose pixel value has been corrected by the correction unit, wherein:

the defective pixel of the first type is defined by calculating correction amounts for image data, based upon a plurality of sets of image data that have been photographed while changing at least one of photographic conditions that are exposure amount, color of incident light, temperature of the image sensor, F-value of a lens, and pupil position of the lens, and when defective pixels of the plurality of sets of image data have been corrected based upon the correction amounts, classifying a defective pixel for which a degree, by which a pixel value after correction does not depart from an output value of a normal pixel, does not exceed by more than a predetermined value, as being the defective pixel of the first type; and the defective pixel of the second type is defined by classifying a defective pixel other than the defective pixel of the first type as being the defective pixel of the second type.

2. An image processing device according to claim 1, wherein:

a correction amount for the defective pixel of the first type is a ratio between an output of a normal pixel and an output of the defective pixel of the first type; and the correction unit performs correction of the pixel value of the defective pixel of the first type, by multiplying the pixel value of the defective pixel of the first type by the correction amount.

3. A correction information generation method for generating a position of a defective pixel of a first type, a position of a defective pixel of a second type, and a correction amount for the defective pixel of the first type of an image processing device according to claim 1, comprising:

calculating correction amounts for image data, based upon a plurality of sets of image data that have been photographed while changing at least one of photographic conditions that are exposure amount, color of incident light, temperature of the image sensor, F value of a lens, and pupil position of the lens;

when defective pixels of the plurality of sets of image data have been corrected based upon the correction amounts, classifying a defective pixel for which a degree, by which a pixel value after correction does not depart from an output value of a normal pixel, does not exceed by more than a predetermined value, as being the defective pixel of the first type;

storing a position of the defective pixel of the first type and a correction amount of the defective pixel of the first type, into a memory;

classifying a defective pixel other than the defective pixel of the first type as being the defective pixel of the second type; and storing a position of the defective pixel of the second type, into the memory.

4. An image-capturing device, comprising:

an image sensor that captures an image of a photographic subject; and an image processing device according to claim 1, that generates image data by performing image processing upon an image signal outputted from the image sensor, wherein:

the image processing device generates the image data by correcting and interpolating a pixel value of a defective pixel included in the image sensor, by using an image signal outputted from the image sensor.

5. An image processing device that corrects and interpolates pixel values of defective pixels present upon an image sensor, comprising:

a position information storage memory that stores a position of a defective pixel of a first type whose pixel value can be utilized after correction, and a position of a defective pixel of a second type whose pixel value is to be interpolated using pixel values of other pixels, distinguished from one another;

a correction amount storage memory that stores a correction amount for the defective pixel of the first type;

a correction unit that corrects the pixel value of the defective pixel of the first type according to the correction amount;

an interpolation unit that interpolates the pixel value of the defective pixel of the second type, using the pixel values of pixels including the defective pixel of the first type whose pixel value has been corrected by the correction unit; and a smoothing unit that takes the defective pixel of the first type after correction by the correction unit, as a smoothing subject pixel to be smoothed, and that smoothes the pixel value of the smoothing subject pixel using the pixel value of the smoothing subject pixel and pixel values of pixels neighboring the smoothing subject pixel, wherein:

the smoothing unit performs smoothing using pixel values of pixels, among the pixels neighboring the smoothing subject pixel, other than the defective pixel of the first type and the defective pixel of the second type.

6. An image processing device according to claim 5, wherein:

the smoothing unit performs smoothing using pixel values of pixels, among the pixels neighboring the smoothing subject pixels, other than the defective pixel of the second type.

7. An image processing device according to claim 5, wherein:

the smoothing unit performs smoothing using pixel values of pixels, among the pixels neighboring the smoothing subject pixels, that have color filters of the same colors as a color filter of the smoothing subject pixel.

8. An image processing device according to claim 5, wherein:

the smoothing unit performs smoothing using pixel values of pixels, among the pixels neighboring the smoothing subject pixels, for which differences from the pixel value of the smoothing subject pixel are within a predetermined value.

* * * * *